United States Patent [19]

Weisend, Jr.

[11] Patent Number: 4,561,613
[45] Date of Patent: * Dec. 31, 1985

[54] DEICER FOR AIRCRAFT

[75] Inventor: Norbert A. Weisend, Jr., Cuyahoga Falls, Ohio

[73] Assignee: The B. F. Goodrich Company, Akron, Ohio

[*] Notice: The portion of the term of this patent subsequent to Jan. 22, 2002 has been disclaimed.

[21] Appl. No.: 493,082

[22] Filed: May 9, 1983

[51] Int. Cl.$^4$ ............................................. B64D 15/18
[52] U.S. Cl. ................................................. 244/134 A
[58] Field of Search ........... 244/134 R, 134 A, 134 B, 244/134 E; 416/39, 97 A, 224

[56] References Cited

U.S. PATENT DOCUMENTS

| | | | |
|---|---|---|---|
| 2,173,262 | 9/1939 | Monegan et al. | 244/134 A |
| 2,436,889 | 3/1948 | Heston | 244/134 A |
| 2,957,662 | 10/1960 | Hess | 244/134 R |
| 3,370,814 | 2/1968 | Kageorge et al. | 244/134 A |
| 3,623,684 | 11/1971 | Kline | 244/134 A |
| 3,690,601 | 9/1972 | Roemke | 244/134 A |

FOREIGN PATENT DOCUMENTS 542878   1/1942   United Kingdom ........... 244/134 A

Primary Examiner—Trygve M. Blix
Assistant Examiner—Rodney Corl
Attorney, Agent, or Firm—Joseph Januszkiewicz

[57] ABSTRACT

A deicer pad for use on an aircraft wing wherein the deicer pad is constructed to have an intermediate portion and two spaced apart portions. The pad is a composite member of at least two plies of materials stitched along the intermediate portion to provide two spanwise passageways, and stitched in a zig-zag pattern along the spaced apart portions to form chordwise passageways. Alternate chordwise passageways communicate directly with the spanwise passageways while the remaining chordwise passageways communicate with the adjacent spanwise passageways around the stitching. The remaining chordwise passageways also communicate with the adjacent alternate chordwise passageways around the stitching which stitching forms the separation between alternate chordwise passageways.

6 Claims, 7 Drawing Figures

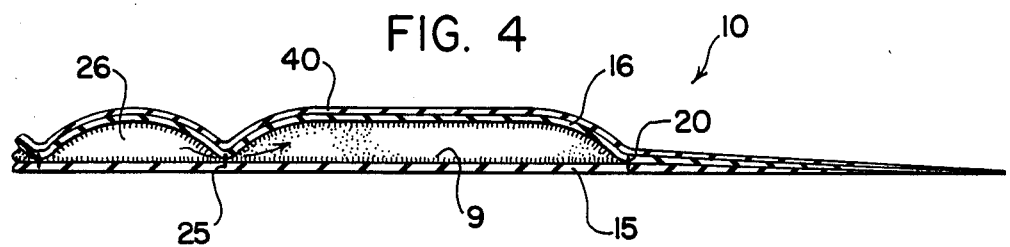
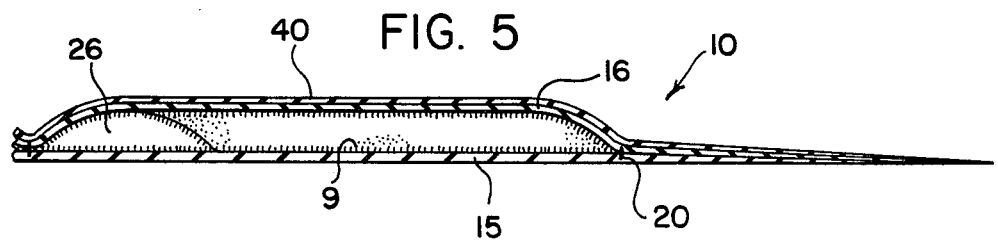
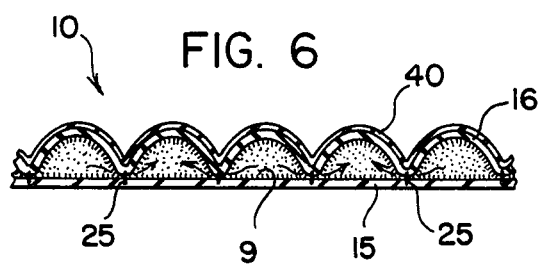

DEICER FOR AIRCRAFT

This application is a co-pending application of Ser. No. 493,125, filed May 9, 1983, now U.S. Pat. No. 4,494,715, issued Jan. 22, 1985.

BACKGROUND OF THE INVENTION

This invention relates to aircraft deicing equipment and more particularly to a new and improved pneumatic deicer for attachment to the wings or airfoil of an aircraft to retard and remove the accumulation of ice therefrom.

Deicing equipment for the fixed wings and airfoils of aircraft include pneumatic inflatable tubes equipped with an air supply system for alternately inflating and deflating the tubes to break away the formation of ice thereon. The continual flexing action shatters the ice layers which is blown away by the airstream as it flows across the airfoil. In order to preserve and maintain a smooth airfoil surface, deicing has turned more and more to electrical heating systems for deicing purposes. The present system of a pneumatic deicer employs a unique combination of composite layers which are designed to provide at least a pair of passageways along the leading edge of an airfoil and chordwise passageways above and below such spanwise passageways to provide an advantageous low aerodynamic drag while effectively removing ice formation from an airfoil system at relatively low cost, low weight and at low operating power while being able to maintain a thin profile in the deflated condition.

SUMMARY OF THE INVENTION

The present invention is directed to a composite layer deicer pad that is mounted on the leading edge of a stationary airfoil such as a wing or tail with an upper and lower portion extending rearwardly therefrom. The inner layers are stitched together to permit the flow of air around such stitching to selectively distend the passageways formed by such stitching. The stitching at the leading edge provides spanwise passageways while the stitching on the upper and lower portions provide chordwise passageways. The chordwise passageways formed by the stitching alternate as open ended passageways that communicate directly with the spanwise passageways while the remaining chordwise passageways are closed end passageways because of the stitching however pressurized air communicates around the stitching from the adjacent spanwise and open ended chordwise passageways to effect the pressurization of such remaining passageways.

BRIEF DESCRIPTION OF THE DRAWINGS

FIG. 4 is an enlarged section taken along line 4—4 of FIG. 3;

FIG. 5 is an enlarged section taken along line 5—5 of FIG. 3;

FIG. 6 is an enlarged section taken along line 6—6 of FIG. 3;

DETAILED DESCRIPTION

Figure 1:
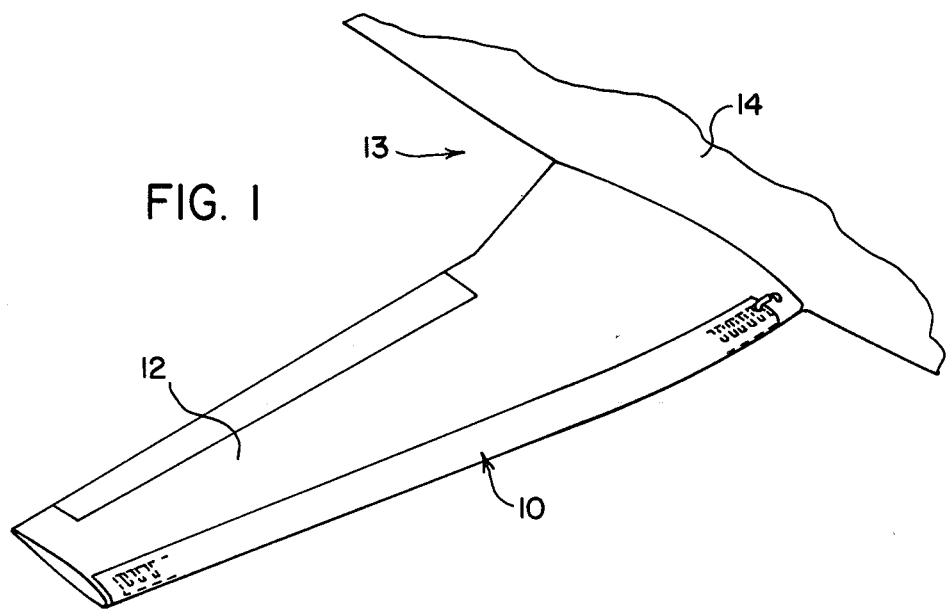
FIG. 1 is a perspective view of a portion of an airplane with pneumatic deicers mounted upon the leading edges of the stationary wing.

Referring to the drawings wherein like reference numerals designate like or corresponding parts throughout the several views, there is shown in FIG. 1 a deicer boot or pad 10 mounted on the leading edge of a wing 12 of an aircraft 13. The wing 12 is attached to the fuselage 14 of such aircraft 13. Although the invention is described with respect to a wing, it is equally applicable to a tail section.

Figure 2:
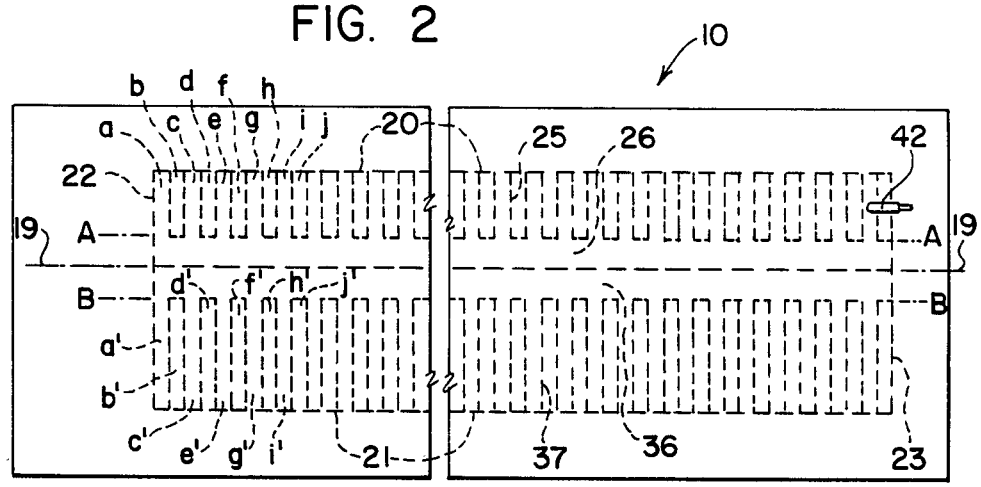
FIG. 2 is a plan view of a deicer boot with the position of the inflation passageways being shown in dotted lines.
Figure 3:
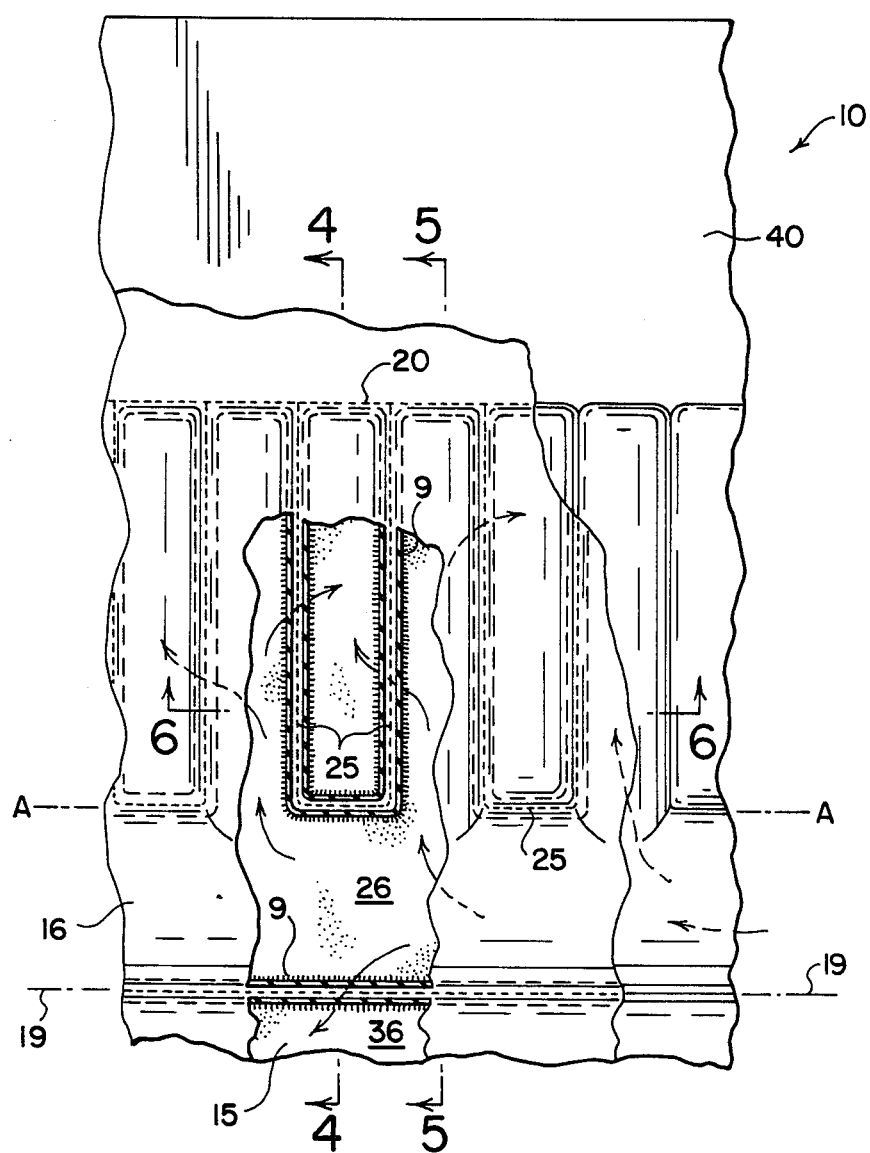
FIG. 3 is an enlarged plan view of a portion of a deicer boot with a portion of the coverings broken away to illustrate the stitching and the air flow pattern within the inflatable passageways.

The deicer pad 10 as mounted extends rearwardly from the leading edge over a portion of the upper and lower surface portions of the wing 12. The deicer pad 10 is a laminated structure having an inner ply 15 (FIGS. 4-6) that is essentially a rectangular section of rubber or other resilient rubber-like material that tapers as the other layers to be described at the respective side edges to facilitate the installation on the wing 12 without interfering with the aerodynamic effects of the airfoil design. In lieu of tapering the plies, the plies can have rectangular sides that fit snugly into recessed portions of the wing. Such deicer pad 10 and ply 15 have a longitudinal center line 19 (FIG. 2) that lies along the leading edge of the wing 12. Such ply 15 may be a woven textile fabric which is suitably coated with a suitable rubber compound to make this ply 15 air impervious. As seen in FIGS. 4-6, the inside of the plies forming the passageways have a heavy nap 9. Such interior napped surface is composed of very short closely grouped flexible fibers of overall uniform thickness. Such fibers mat together and collectively prevent complete closure and direct contact between opposing internal surfaces of the passageways to be described when the deicer pad is deflated, but have interstices through which residual air in the passageways may be vented or pumped as by a vacuum from the passageways. By such uniform distribution of fibers, the external surface of the deicer pad is smooth and regular when the passageways are deflated and flattened. The terms spanwise and chordwise are used herein to designate the general direction of the passageways within the deicer pad. Spanwise is in a direction parallel to the leading edge of the helicopter airfoil while chordwise is along a line extending from the leading edge of the airfoil to the trailing edge of the airfoil (which is generally normal to the leading edge of the airfoil or normal to the spanwise direction). The final coating of the ply 15 is deferred until the ply stocks are stitched in a manner to be described. A ply 16 (FIGS. 4-6) of tricot fabric overlays ply 15 and is stitched to such ply 15 along the longitudinal center line 19 as indicated in FIGS. 2 and 3. The plies 15 and 16 are then stitched along the outer edge portion as at 20 and 21 and side edge portions as at 22 and 23.

That portion of the pad 10 that lies between the longitudinal center line 19 and the outer edge stitched portion 20 is the upper deicer portion and that portion of the pad 10 that lies between the longitudinal center line 19 and the outer edge stitched portion 21 is the lower deicer portion. Beginning along the outer edge 20 of the upper portion of the deicer pad namely plies 15 and 16, the plies are stitched together by running the stitching seam 25 back and forth in a zig zag pattern from outer edge 20 to a line adjacent the longitudinal center line 19, which line lies along a line marked A—A in FIG. 2. This type of stitching leaves a series of passageways that extend chord wise along the pad indicated as "a" though "j" only, however the full length of the pad has such chordwise passageways. With such stitching, alternate passageways such as "a", "c", "e", "g", "i", etc. open directly to a spanwise or longitudinally extending passageway 26 which extends the full length of the deicer pad 10. Passageway 26 is defined by the stitching along the longitudinal center line, the end stitching 22 and 23, and that portion of the zig zag stitching that lies along line A—A. The alternate passageway "a" through "i" etc. as above described are referred to as the open ended chordwise passageways which passageways communicate directly or unobstructedly with the spanwise passageway 26. The remaining alternate passageways "b", "d", "f", "h", "j", etc. referred to as the closed end passageways also communicate with passageway 26, but through or around the zig zag stitching 25 as illustrated in FIGS. 3-4. The closed end passageways "b", "d", "f", "h", "j", etc. also obtain pressurized air from adjacent open ended passageways through or around the zig zag stitching 25 (as illustrated in FIGS. 3 and 6).

In a similar manner the lower deicer portion has a longitudinally extending passageway 36 (similar to passageway 26) as defined by the stitching along the longitudinally extending centerline, the end stitching 20, 21 and that portion of zig zag stitching that lies along a line B—B (FIG. 2). Beginning along the outer edge 21 of the lower portion of the deicer pad, namely plies 15 and 16, the plies are stitched together by running the stitching seam 37 back and forth in a zig-zag pattern from the outer edge 21 to the line marked B—B in FIG. 2. This type of stitching leaves a series of passageways that extend in a chordwise direction along the deicer pad 10, which passageways are indicated as a', b', through j' etc. for the full length of the pad as indicated in FIG. 2. With such stitching, alternate passageways such as a', c', e', g', i', etc. open directly to a spanwise or longitudinally extending passageway 36, which passageway 36 extends for the full length of the deicer pad 10. These alternate passageways a', c', e', g', i', etc. as described above are referred to as the 'open ended passageways' that communicate directly with the spanwise passageway 36. The remaining alternate passageways b', d', f', h', j', etc. referred to as the 'closed end passageways' also communicate with passageway 36, but do so by air flowing around the zig zag stitching 37.

The respective spanwise passageways 26 and 36 act as manifolds while simultaneously operating to break up the ice on the leading edge of the deicer pad 10. The longitudinally extending passageways 26 and 36 are operative to communicate rapidly with the open ended passageways as well as the closed end passageways thereby effectively operating to break up the ice on the leading edge of the wing 12.

After the stitching of the plies 15 and 16, the lower or inner ply is coated with a suitable rubber compound to make such ply 15 impervious to air. A second ply 40 of suitable air impervious rubber compound, which ply 40 is suitably adhered to the adjacent ply 16 to essential make a single composite deicer pad. Such outer ply 40 may be an exterior rubber gum ply which is a resilient rubber compound such as a polyurethane or neoprene rubber which is resistant to the erosion of wind and rain. To inflate the respective passageways and passageways of the deicer a conduit 42 connects one of the open ended passageway to a suitable air pressure source (not shown) and to a vacuum source.

Figure 7:
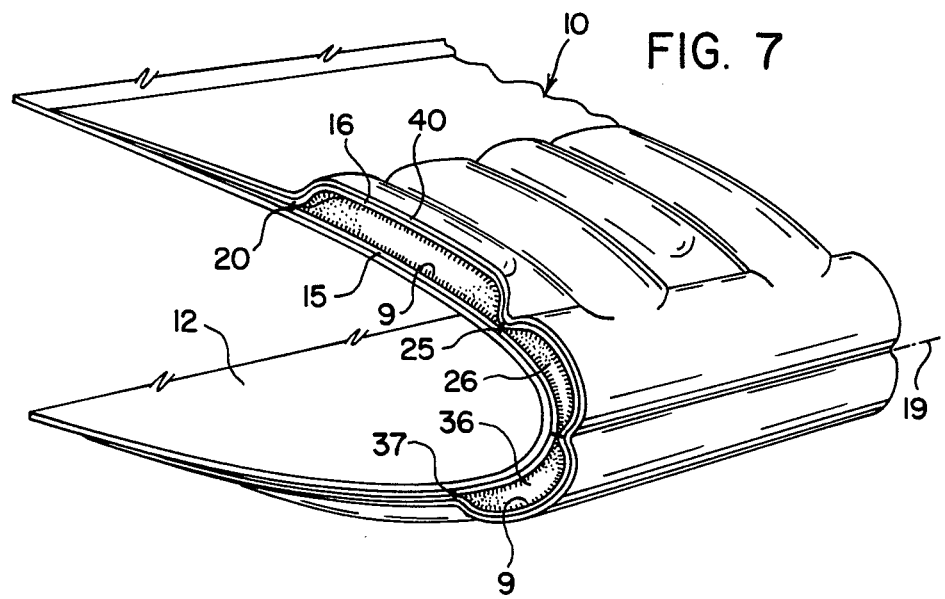
FIG. 7 is an enlarged perspective view partly in section of a portion of a portion of a wing showing the pneumatic deicer in distended condition.

In an installation of the above described deicer pad 10 on the wing 12 of an aircraft, the deicer shoe, or pad 10 is adhered flat against the surface of the leading edge and adjacent portions of the blade by a suitable adhesive of which many different kinds are well known in the art such that the longitudinal center line 19 of the deicer pad 10 coincides with the centerline of the leading edge of the wing 12. The inner or bottom ply 15 has its upper portion adhered to the upper tapering surface of the wing 12 while the lower portion of the ply 15 is adhered to the lower tapering surface of the wing. The sewing or stitching permits the crossflow of air from the open ended passageway to the closed end passageway and vice versa as well as from the spanwise longitudinally extending passageways 26 and 36 to the closed end passageways. As seen in FIG. 7, the pressurization of the passageways 26 and 36 distends the spanwise passageways while simulataneously communicating directly with the open ended passageways a, c, e, g, i, etc. and a', c', e', g', i', etc. The remaining closed end passageways are inflated by the crossflow of air from the opened end passageways and the main spanwise passageways. Such pressurization stretches the deicing passageways and the corresponding plies which provides the cracking and shearing stresses to the ice thereon causing such ice to be broken into pieces and breaking its bond with the deicing surface. This coupled with the scavenging effect of the air stream will remove the ice particles from the wing 12. This combination of utilizing the spanwise passageways along the leading edge of the blade airfoil while using the chordwise passageways along the upper and lower portions of the pad provide a low aerodynamic drag while maintaining excellent ice removal characteristics. When the deicing system is off, a vacuum is applied to the deicing passageways to resist negative aerodynamic pressures and to maintain the ply stock that makes up the deicer in a flat or deflated condition. The deicer pad 10 has tapered trailing edges as well as ends to promote a smooth airflow, otherwise the airfoil can be recessed to provide for the thickness of the deicer pad to provide a smooth transition from pad to airfoil. The current electrical requirements for the system in the on position is approximately 0.50 amps or less with 0.05 miliamps or less for a timer to operate a flow control valve for intermittent operations of less than 2 second intervals.

Various modifications are contemplated and may obviously be resorted to by those skilled in the art without departing from the described invention, as hereafter defined by the appended claims, as only a preferred embodiment thereof has been disclosed.

I claim:

1. A pneumatic deicer pad for a wing of an aircraft having a leading edge, an inboard end and an outboard end; said pad having an intermediate portion with a centerline overlying said leading edge and also having a pair of spaced apart portions located rearward of said centerline when positioned on said wing to provide a pair of rearwardly disposed edges; said centerline of said deicer pad coincides with said leading edge of said wing; said spaced apart portions defining an upper portion and a lower portion; said deicer pad having an inner ply for attachment to said wing; an outer extensible elastic ply overlying said inner ply; said plies being stitched on said intermediate portion to define at least a pair of spanwise passageways; said plies being stitched together at said respective rearwardly disposed spaced apart portions to define two groups of passageways, with each group having a plurality of adjacent chordwise extending passageways in side by side relationship that all terminate adjacent one of said spanwise passageways; one of said groups of passageways located in said upper portion and the other of said groups of passageways located in said lower portion; certain ones of said chordwise passageways in each group communicate directly with adjacent ones of said spanwise passageways; the remaining ones of said chordwise passageways in each group communicate with said spanwise passageways around said stitching with the adjacent ends of said spanwise passageways; said certain ones of said chordwise passageways in each group also communicate with adjacent ones of said remaining ones of said chordwise passageways around adjacent stitching; means for communicating said passageways with a pressure source which is operative upon pressurization to elastically distend the portions of said outer ply by inflating said passageways; and all of said plies being covered with an air impervious layer to retain pressurized air within said deicer pad.

2. A pneumatic deicer pad for a wing of an aircraft as set forth in claim 1 wherein said stitching on said inner ply and said outer extensible ply on said rearwardly disposed spaced apart portions are of a zig-zag design to provide said chordwise passageways in side by side relationship.

3. A pneumatic deicer pad for a wing of an aircraft as set forth in claim 2 wherein said means for communicating said passageways with a pressure source includes a means for pulling a vacuum on said passageways.

4. A pneumatic deicer pad for a wing of an aircraft as set forth in claim 3 wherein said spanwise passageways are of greater cross-sectional dimension than said chordwise passageways.

5. A pneumatic deicer pad for a wing of an aircraft as set forth in claim 4 wherein said chordwise passageways in said lower portion of said pads are greater in length than said chordwise passageways in said upper portion of said pad.

6. A pneumatic deicer for a wing of an aircraft, said wing having a leading edge, an inboard end, and an outboard end; a deicer pad with an upper portion, a lower portion and an intermediate portion; said intermediate portion disposed along said leading edge of said wing; one end of said deicer pad having an inboard end at said inboard end of said wing and the other end of said pad being an outboard end extending outwardly toward said outboard end of said wing; said deicer pad having a pair of laterally spaced side edges interconnecting said inboard end with said outboard end of said deicer pad; said pad being a composite layer of resilient air impervious material; said pad being stitched along said spaced side edges; said pad being stitched at said intermediate portion to define a pair of longitudinally extending spanwise passageways located along said leading edge of said wing; said spanwise passageways sharing a common seam disposed along said longitudinal center line of said pad; each of said passageways having a side edge that is spaced to either side of said intermediate portion; said upper portion of said pad and said lower portion of said pad each having a continuous stitching seam that extends in a zig zag pattern from said inboard end of said pad to said outboard end of said pad to define a series of closely spaced chordwise passageways that extend to said spanwise passageway; certain ones of said chordwise passageway communicating directly with adjacent ones of said spanwise passageways; the remaining one of said chordwise passageways communicating with adjacent ones of said first mentioned chordwise passageways that communicate directly with said spanwise passageway and said remaining chordwise passageways also communicate with adjacent ones of said spanwise passageways around said stitching seams separating their connection to said adjacent chordwise and spanwise passageways; means connected to one of said passageways that communicates directly with said spanwise passageway to pressurize and exhaust air from said deicer pad to provide a deicing action for said wing; and said composite layers of air impervious material being covered with a resilient rubber air impervious material.

* * * * *